United States Patent [19]

Forner

[11] Patent Number: 5,234,019

[45] Date of Patent: Aug. 10, 1993

[54] FILL CONTROL VALVE FOR REFRIGERANT CONTAINER

[75] Inventor: Charles K. Forner, Longmeadow, Mass.

[73] Assignee: Engineering and Sales Associates Inc., Springfield, Mass.

[21] Appl. No.: 924,369

[22] Filed: Jul. 31, 1992

Related U.S. Application Data

[63] Continuation of Ser. No. 825,700, Jan. 27, 1992, abandoned.

[51] Int. Cl.$^5$ .............................................. F16K 31/26
[52] U.S. Cl. ...................................... 137/410; 137/442; 137/493.8; 141/213
[58] Field of Search .............. 137/410, 434, 433, 442, 137/493, 493.8, 592, 599, 493; 141/213, 216

[56] References Cited

U.S. PATENT DOCUMENTS

| | | | |
|---|---|---|---|
| 2,184,773 | 12/1939 | Browning | 137/493.8 |
| 2,767,552 | 10/1956 | Clute | 141/213 X |
| 4,313,459 | 2/1982 | Mylander | 137/433 X |
| 4,462,417 | 7/1984 | Trinkwalder | 137/442 X |
| 4,986,320 | 1/1991 | Kesterman et al. | 141/216 X |
| 4,998,571 | 3/1991 | Blue et al. | 137/410 X |
| 5,027,871 | 7/1991 | Guenther | 137/434 X |

FOREIGN PATENT DOCUMENTS 2540595 8/1984 France ................................ 137/434

*Primary Examiner*—Stephen M. Hepperle
*Attorney, Agent, or Firm*—Fishman, Dionne & Cantor

[57] ABSTRACT

A fill control valve for a pressure vessel, e.g. a refrigerant container wherein said valve is disposed within said container and includes a pair of fluid passageways wherein a one-way check valve is disposed in one of said passageways for permitting flow of liquid refrigerant from inside said vessel to a point outside of said vessel and the other of said passageways permits the filling of said vessel with liquid and gas refrigerant. Said other passageway being provided with a normally closed spring-loaded poppet valve and float activated lever means for closing said valve at a pre-determined refrigerant level in said vessel.

5 Claims, 2 Drawing Sheets

5,234,019

FILL CONTROL VALVE FOR REFRIGERANT CONTAINER

This is a continuation of copending application Ser. No. 07/825,700 filed on Jan. 27, 1992, now abandoned.

TECHNICAL FIELD

The present invention pertains to the art of pressure vessels, and more particularly to a fill control valve for a refrigerant container.

BACKGROUND OF THE INVENTION

Chlorofluorocarbon compounds are commonly used is working fluids in a variety of refrigeration equipment. Chlorofluorocarbon compounds are conventionally stored in any one of a group of commercially available pressure vessels. A safety valve is provided on such vessels in order to preclude the generation of internal pressures in excess of the pressure rating of the vessel. The safety valve opens if the internal pressure within the refrigerant vessel exceeds a predetermined maximum pressure. The predetermined maximum pressure is lower than the maximum pressure rating of the vessel. In order to avoid generating internal pressures which would trigger the safety valve, the amount of refrigerant that is introduced to the refrigerant vessel is controlled. Typically, a quantity of refrigerant fluid sufficient to fill approximately 80% of the internal volume of the vessel is introduced to the vessel. The 80% fill level allows for safe operating pressures under the worst case conditions of filling the vessel at a relatively low temperature, e.g. about 25° F. and then shipping or storing the vessel at a relatively high temperature, e.g. up to about 130° F.

Conventionally, refrigerant vessels are filled by weight. Weighing a pressure vessel and its contents requires a cumbersome apparatus. The requirements of weighing a pressure vessel and its contents becomes particularly onerous when filling refrigerant vessels in the field, e.g. during a refrigerant recovery process as described in U.S. Pat. No. 4,766,733.

Accordingly, it is an object of the present invention to provide a fill control valve for refrigerant vessels which permits the filling of said vessels without requiring weighing of the vessel.

It is another object of the present invention to provide a fill control valve which is mechanical and does not require the use of electricity for operation.

It is a further object of the present invention to provide a fill control valve which may be used with standard refrigerant vessel flow control valves.

The above and other objects and advantages of the present invention will become apparent to those skilled in the art when considered with the following discussion.

SUMMARY OF THE INVENTION

A fill control valve for a refrigerant container is disclosed. The valve allows control of the volume of refrigerant fluid introduced into a refrigerant vessel without requiring weighing of the container and its contents. The fill control valve is disposed within the refrigerant vessel and is connected to the vessel flow control valve via an inlet/outlet conduit.

The fill control valve comprises a float controlled inlet check valve and an outlet check valve which control the volume of refrigerant fluid in a refrigerant vessel. The float controlled inlet check valve permits only a preselected volume of fluid to be introduced into the vessel, and the outlet check valve permits fluid in the vessel to be removed therefrom.

DETAILED DESCRIPTION OF THE DRAWINGS

Figure 1:
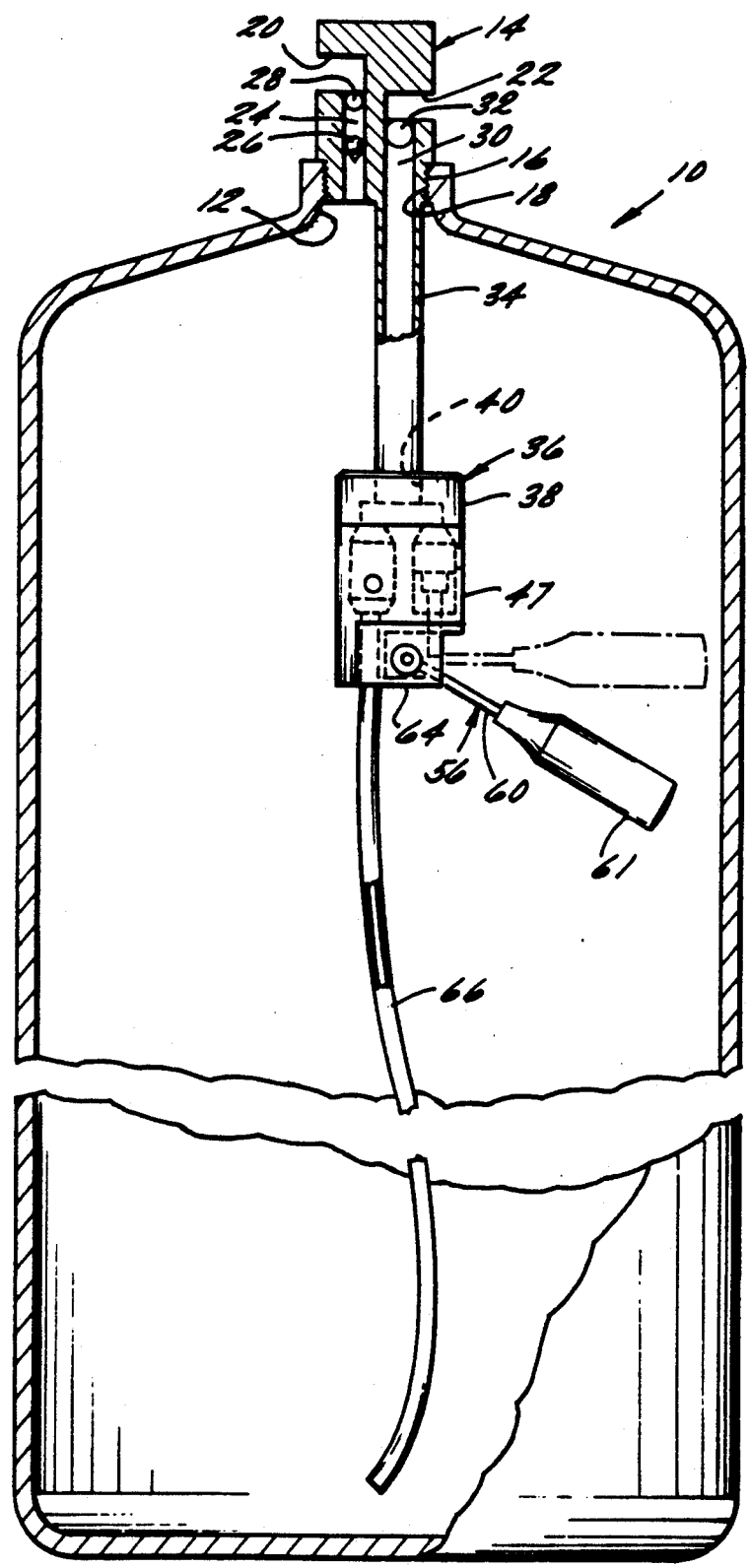
FIG. 1 is a front elevation view of a refrigerant vessel having sections broken away showing the fill control valve of the present invention.
Figure 2:
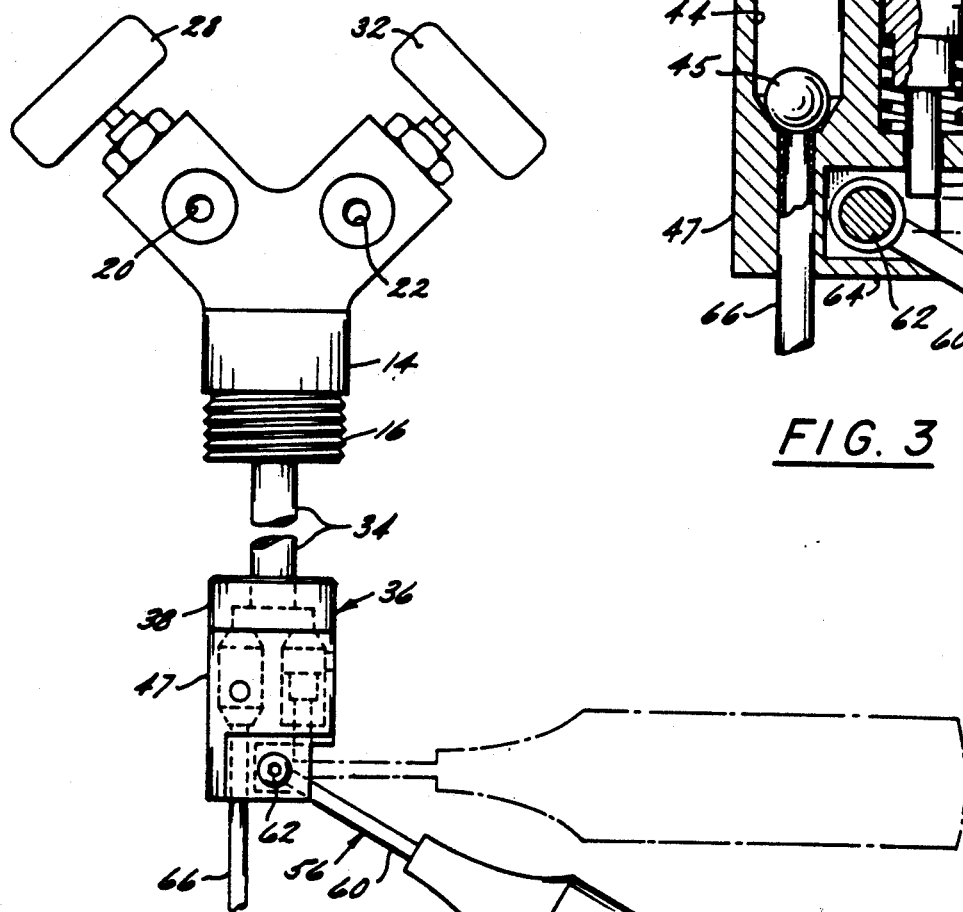
FIG. 2 is a partial view of the flow control and fill control valves shown in FIG. 1.
Figure 4:
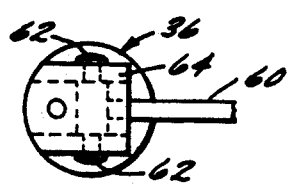
FIG. 4 is a bottom view of the fill control valve of the present invention.

Referring to FIG. 1, a refrigerant container or vessel is shown at 10. As depicted, the container has a bottle-like shape and has an opening 12 disposed in the top thereof. As shown schematically in FIG. 1 and in full in FIG. 2, a flow control valve 14 is affixed to the container 10 in the opening 12 by threads 16 on said valve 14 and threads 18 disposed in said opening 12.

The flow control valve 14 is provided with outlet port 20 and inlet/outlet port 22. Outlet port 20 communicates with passageway 24, and said passageway 24 is provided with a one-way check valve 26 and a manual valve 28 which together only permit gases to flow from inside said container 10 through said passageway 24 to a point outside of said container 10.

The inlet/outlet port 22 communicates with passageway 30 which is also provided with a manual valve 32 for permitting gas and/or liquid flow into said container 10 and liquid flow out of said container 10 through said passageway 30.

Figure 3:
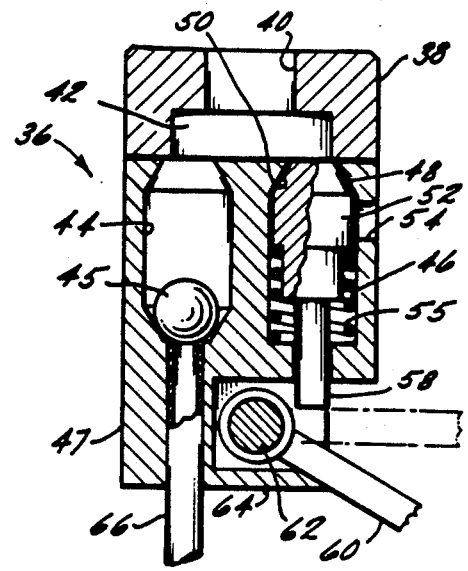
FIG. 3 is a section view of the fill control valve of the present invention.

As shown in FIG. 1, a tube or conduit 34 connects passageway 30 to fill control valve 36. As best seen in FIG. 3, the lowermost end of conduit 34 is affixed to top portion 38 of valve 36 via port 40 disposed therein. The top portion 38 is also provided with chamber 42 which communicates with a first valve passageway 44 and a second valve passageway 46 disposed in the main body 47 of said valve 36. As shown, first valve passageway 44 has a one-way check valve 45 disposed therein which permits liquid to flow from said container 10 through said passageway 44 to a point outside of said container 10.

The second valve passageway is provided with a valve chamber 48 having a valve seat 50 and a poppet valve 52 disposed therein. An outlet port 54 communicates with said chamber 48 and is normally closed to the passage of liquid and gas therethrough by poppet valve 52 being held against valve set 50 via the action of spring means 55 which urges the seating of said valve 52 in valve seat 50.

As further shown, a lever means 56 can also urge the poppet valve 52 to a closed position by contact of said means with a finger 58 which depends downwardly from the underside of the poppet valve 52. Said lever means 56 comprises a lever arm 60 having float means 61 disposed on one end thereof and the other end thereof pivotally disposed on pin or pins 62 disposed in lever support 64. The operation and function of said lever means 56 will be explained below.

As also shown, valve 36 is provided with a second conduit or tube 66 which extends downward from said first passageway 44 of said valve 36 to a point just above the bottom of said container 10.

The operation of the fill control valve 36 of the present invention is relatively simple and does not require the use of an outside source of electrical power. Prior to filling the container 10 with refrigerant from an outside source, the empty container is in a condition wherein all valves are closed and the lever arm 60 of lever means 56 depends downwardly at an angle whereby the lever arm 60 is out of contact with finger 58 of poppet valve 52. In this condition, i.e. with no fluid flow into the container 10, the poppet valve 52 is in a closed position, i.e. valve 52 is in contact with valve seat 50.

In order to fill the container with gas and liquid refrigerant, a source thereof is connected to inlet/outlet port 22 and manual valve 32 is opened. Refrigerant under pressure then passes through passageway 30 and conduit 34 into port 40 and chamber 42 of the top 38 of valve 36. At this point, the pressure of the gas/liquid overcomes the force of spring means 55 thereby opening poppet valve 52 which permits the gas/liquid refrigerant to enter the valve chamber 48 and pass through outlet port 54 into the container 10. Refrigerant is prevented from passing through first valve passageway 44 by check valve 45. This condition will continue until such time as either (1) manual valve 32 is closed or (2) liquid refrigerant added to the container 10 rises to a level whereby lever means 56 is pivoted upwardly by reason of the rising liquid level in said container which carries the float means 61 and Pivots the lever arm 60 into contact with finger 58 of poppet valve 52 whereby the poppet valve 52 contacts its valve seat 50 thus closing off outlet port 48.

When the refrigerant filled vessel 10 is in a static condition, gas in the vessel may be exhausted from same by merely opening manual valve 28. Liquid refrigerant may be drawn from said vessel by opening valve 32 which then permits liquid to flow through conduit 66 into the first valve passageway 44 past check valve 45, through chamber 42 and port 40 into conduit 34 and out of flow control valve 14 via passageway 30 out inlet/outlet port 22.

While preferred embodiments have been illustrated and described, various modifications and substitutions may be made thereto without departing from the spirit and scope of the invention. Accordingly, it is to be understood that the present invention has been described by way of illustration and not limitation.

What is claimed is:

1. Fill control means for a refrigerant vessel said means comprising a flow control valve for permitting or stopping flow of refrigerant into or out of said vessel, said flow control valve including an inlet/outlet passageway through said valve for passing liquid and gas refrigerant into said vessel and liquid refrigerant out of said vessel, an outlet passageway through said valve for passing gas refrigerant out of said vessel and manual valves associated with each passageway a fill control valve disposed within said vessel for controlling the volume of liquid refrigerant added to said vessel, said fill control valve including a main body and a top portion, a first passageway through said main body, a one-way check valve disposed in said first passageway, a second passageway through said main body, a valve chamber disposed in said passageway, an outlet port in said main body communicating with said valve chamber, a poppet valve and valve seat disposed in said chamber for closing said outlet port, said poppet valve being urged to a closed position against said valve seat by spring means, a finger disposed on the bottom of said poppet valve, and lever means for contacting said finger in order to maintain said poppet valve in a closed position against the valve seat at a predetermined volume of liquid refrigerant in said vessel, said lever means including float means associated therewith.

2. Fill control means for controlling the volume of refrigerant fluid in a refrigerant vessel, said fill control means comprising a flow control valve for permitting or stopping the flow of refrigerant fluid into or out of said vessel; and, a fill control valve disposed within said vessel for controlling the volume of fluid refrigerant passing into said vessel through said fill control means;

said fill control valve including a first passageway having a valve disposed therein for permitting fluid refrigerant to flow from said vessel through said flow control means to a point outside of said vessel; a second passageway having a pressure responsive valve disposed therein for permitting the flow of fluid refrigerant under pressure through said flow control valve into said vessel; and means for closing said pressure responsive valve in response to a pre-selected volume of liquid refrigerant in said vessel.

3. The fill control means of claim 2 wherein said flow control valve includes an inlet/outlet passageway through said valve for passing liquid or gas refrigerant into said vessel and liquid refrigerant out of said vessel, an outlet passageway through said valve for passing gas refrigerant out of said vessel, and a manual valve associated with each said passageway for opening and closing said passageway.

4. The fill control means of claim 2 wherein said pressure responsive valve includes spring means for urging said valve to a closed position and a finger disposed on said valve depending downwardly therefrom.

5. The fill control means of claim 2 wherein said means for closing said pressure responsive valve includes float activated lever means in contract with said finger for closing said pressure responsive valve when a pre-selected volume of liquid refrigerant is present in said vessel.

* * * * *